Dec. 11, 1951          J. KAPPEL          2,578,361
PLASTIC MOLD FOR ICE CREAM, CONFECTIONS, ETC
Filed June 13, 1946          2 SHEETS—SHEET 1
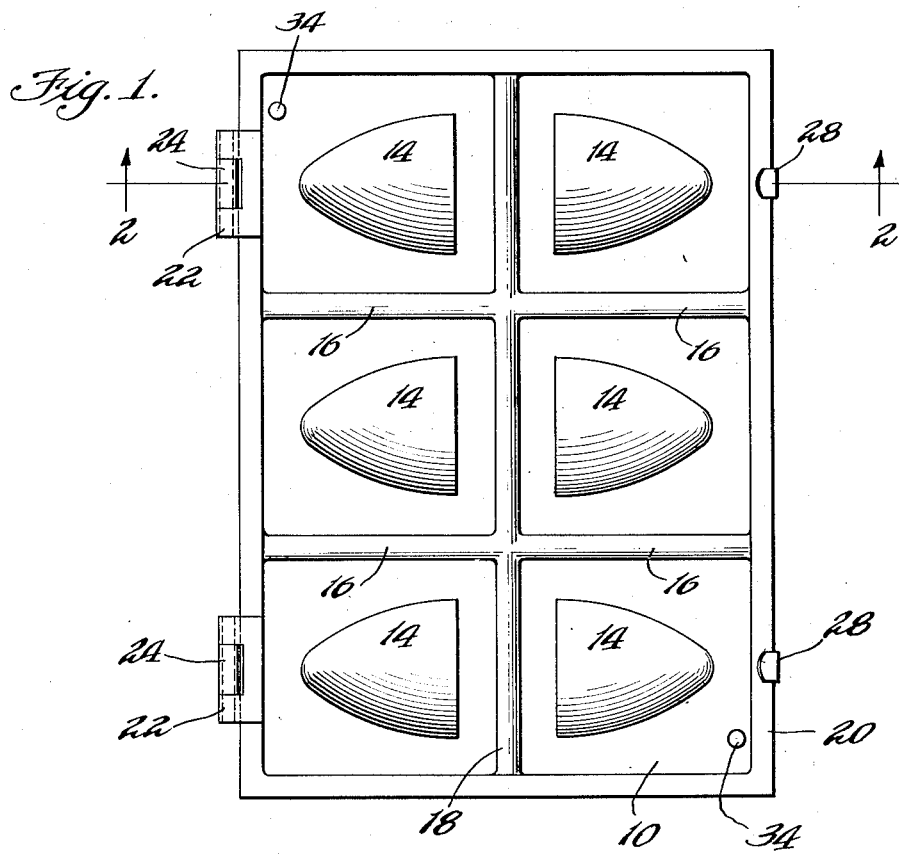
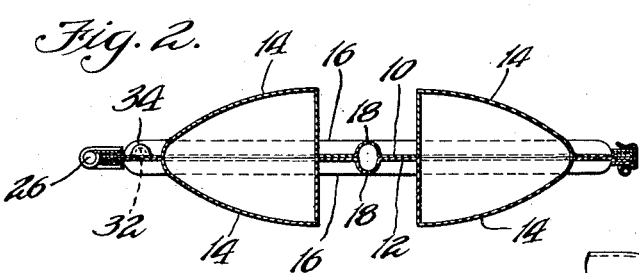
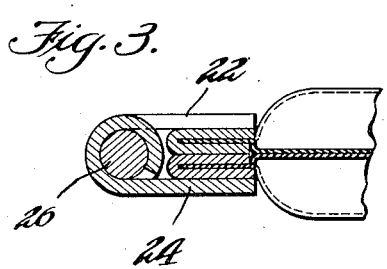
Inventor
John Kappel
By Harry H. Hitzeman
Atty.

Dec. 11, 1951  J. KAPPEL  2,578,361
PLASTIC MOLD FOR ICE CREAM, CONFECTIONS, ETC
Filed June 13, 1946  2 SHEETS—SHEET 2

Inventor
John Kappel
By Harry H. Hitzeman
Atty.

Patented Dec. 11, 1951

2,578,361

UNITED STATES PATENT OFFICE 2,578,361

PLASTIC MOLD FOR ICE CREAM, CONFECTIONS, ETC.

John Kappel, Chicago, Ill.

Application June 13, 1946, Serial No. 676,381

2 Claims. (Cl. 107—19)

My invention relates to improvements in molds for ice cream, confections, gelatins or similar material and is more particularly directed to molds for a plurality of units at the same time.

In making molded objects of ices, ice cream, chocolate, jelly or other similar materials, hardening or setting of the same takes place when they are subject to either high or low temperatures. Some confections are baked whereas others are subjected to freezing temperature for a period of time. Some molds for baking or for frozen confections have been made of sheet metal drawn and formed to the desired shape. Others are made of cast iron or aluminum castings hingedly connected together, so that when closed a cavity therein is formed of the two halves, so that a regular object such as a strawberry, rabbit, Santa Claus, etc. can be molded.

For making a multiple mold, drawing of sheet metal cannot be done for the reason there is too great a draw in a single sheet. Consequently, these molds have to be cast of metal such as iron, brass, bronze or aluminum. The thickness of the metal is usually so great that the molding of some frozen or heated confections is impractical because of the length of time required for heat or cold to penetrate this metal. Therefore, the problem presented here is to provide a mold of the type referred to which has the qualities of metal for rigidity and strength, but is capable of easy and instantaneous temperature transmission. This latter quality requires extreme thinness and the material that can be formed to any desired contour as to depth of cavity.

Thermo-plastic materials have been tried, but a plastic sufficiently thin is too flexible to be capable of easy handling. Accordingly, the principal object of the invention is to provide a mold of plastic so constructed that that while sufficiently thin for temperature transmission, it is also sufficiently rigid and firm so that it can be satisfactorily handled.

A further object of my invention is to provide a two-part multiple mold formed of plastic and reinforced so that when the parts are filled and fastened together the unitary structure will be sufficiently rigid and strong, so that it can be easily handled without flexing or breaking A further object of the invention is to provide hingedly connected multiple mold sections, each of which has similar cavities juxta-positioned so that when filled with a confection to be frozen or heated the complete confection will be produced in the form it actually has.

A further object of the invention is to provide multiple molds of the type described, easily and cheaply made and capable of long and hard usage without wearing out or breaking.

Other objects and advantages will be more apparent from the following description wherein reference is had to the accompanying drawing upon which:

Fig. 1 is a plan view of one type of multiple cavity molding unit in accordance with the present invention;

Fig. 2 is a cross sectional view of the same taken generally on the line 2—2 of Fig. 1;

Fig. 3 is an enlarged fragmentary sectional view of the hinge portion taken generally at section 2—2;

Fig. 4 is a similar enlarged fragmentary sectional view of the spring clip member which holds the two sections of the molding unit together and is also taken generally at the section line 2—2;

Figure 5:
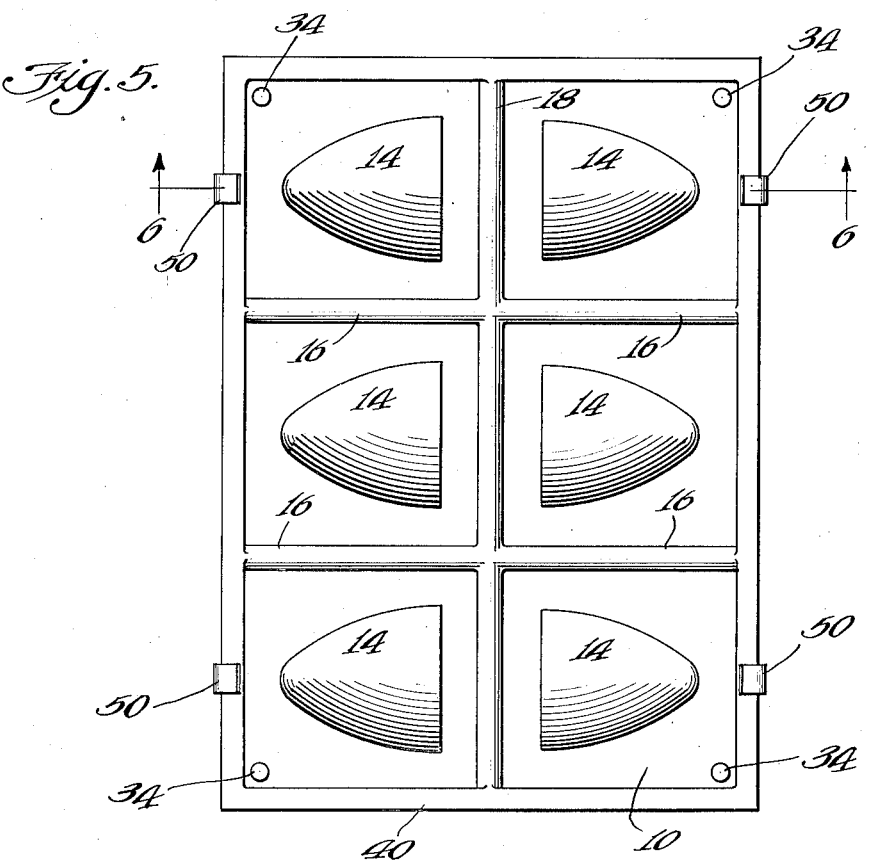
Fig. 5 is a plan view of a modified form of the invention wherein no hinges are employed.

As hereinbefore previously described, the multiple cavity molding unit, which I have chosen to illustrate, may be formed from a pair of rectangular plate members 10 and 12 identical in construction. Each of the plate members is provided with a plurality of cavities 14 which may be of any suitable or desirable shape, the important factor being when two of these cavities are pressed together, as shown in Fig. 2, they will form the space for the molding of an article such as a strawberry, a flower, an animal, a heart or any other similar object which generally form a dividing line, is equally spaced upon both sides of the same.

The material I use for the rectangular plates 10 and 12 is preferably a thin thermo-plastic material approximately .020 inch thick, it being of a type that is capable of having comparatively large cavities molded therein, specifically cavities much larger and much deeper than can possibly be drawn in sheet metal regardless of the thickness of the sheet metal.

Thermo-plastic of this thickness is of necessity comparatively flexible and lacking in tensile strength and, to overcome this defect, I have provided a plurality of of reinforcing ribs 16 and 18 in the walls of the plates. These ribs add sufficient strength to the body of each plate so that it is sufficiently rigid for ordinary handling.

In addition, and to provide rigidity for the edges of the plates, I have secured a somewhat harder plastic edge to each of the plate members, the edge comprising the U-shaped member 20 which surrounds the plate members 10 and 12 and provides a reinforcement for each plate. I provide hinge members 22 secured to the upper plate 10 and a similar hinge member 24 secured to the lower plate operatively connected on the pin 26 so that two plates 10 and 12 hingedly secured together along one edge may be opened to receive a confection to be treated and then closed to effectively seal into the cavities 14 the material which is to be treated. In order to fasten the plates together I provide suitable clip members 28 secured to the lower plate 12 and mounted upon a pin 30 and adapted to swing over and yieldingly fasten together the edges of the plates 10 and 12, thus effectively closing the plates between the hinges and the clips to provide a multiple cavity molding unit that can be placed into a heating or cooling medium for treatment and, when completed, removed from the same and opened to remove the contents of the cavities.

In order to accurately align the outlines of the cavities 14, I provide a pair of locating buttons 32 upon the lower plate 12 and a pair of cap portions 34 upon the upper plate 10; the cap portions 34 being adapted when the plates are folded together to be closed to center over the buttons 32 and accurately align the edges of the cavities 14.

Figure 6:
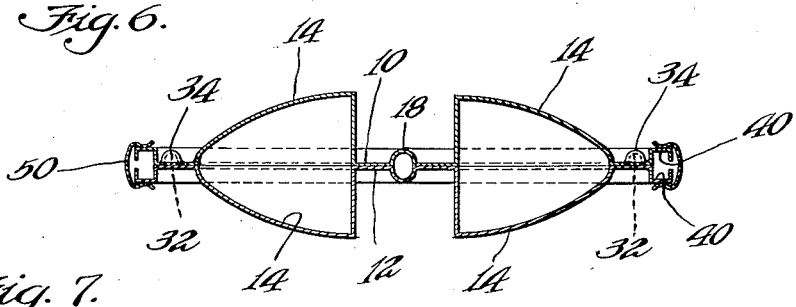
Fig. 6 is a sectional view of the same taken generally on the line 6—6 of Fig. 5.
Figure 7:
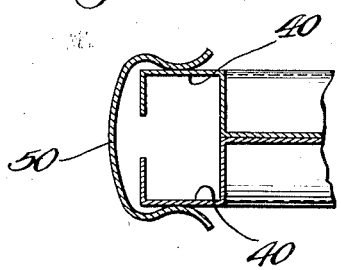
Fig. 7 is an enlarged fragmentary view showing one of the clip members for yieldingly connecting together the two sections of the molding unit.

In the embodiment of the invention shown in Figs. 5 to 7, I have dispensed with the original reinforcing edge members 20 on each of the plates 10 and 12, but instead I provide a reinforcing ledge 40 about the entire outline of each of the plates 10 and 12. I have provided similar buttons and caps 32 and 34 for accurately aligning the edges of the cavities 14 and the same lateral and cross-ribs 16 and 18 to effect in each of the plates 10 and 12 sufficient rigidity necessary for convenient handling of the same.

To secure together the two half sections of the multiple cavity mold I use a plurality of spring clip members 50 which may be placed at random over the edges of the plates 10 and 12 to effectively secure them together after they have been filled with a confection to be treated and accurately aligned upon each other by means of the buttons 32 and caps 34.

From the above and foregoing description, it will be apparent to those skilled in the art that I have provided a plastic mold which has a multiplicity of cavities therein of a size and depth incapable of manufacture out of sheet metal. Due to the thickness of the plastic wall of the plates which form the mold, heat or cold penetrates rapidly thus insuring quick freezing or baking and, in turn, when the material has been frozen or baked, quick cooling for the removal of the same.

While I have illustrated and described a specific embodiment of the same, it will be apparent to those skilled in the art that changes and modifications may be made in the exact details shown and I do not wish to be limited in any particular; rather what I desire to secure and protect by Letters Patent of the United States is:

1. A multiple cavity molding unit comprising a pair of similarly shaped rectangular plastic plates, each of said plates having a reinforced flattened perimetric edge, clamps for securing opposed edges of said plates together, said plates each having flat inner faces adapted to be pressed together, each plate constructed with a plurality of cavities, each cavity adapted to receive half of an object to be formed in the juxtapositioned cavities of the two faces, the edges of said cavities being aligned so that a complete object is molded in each set of cavities, and reinforcing braces comprising ridges formed in each of the outer faces of said plates, said ridges extending in transverse directions between four adjacent cavities.

2. A multiple cavity molding unit comprising a pair of similarly shaped rectangular plastic plates, each of said plates having a reinforced flattened perimetric edge, clamps for securing opposed edges of said plates together, said plates each having flat inner faces adapted to be pressed together, each plate constructed with a plurality of cavities, each cavity adapted to receive half of an object to be formed in the juxtapositioned cavities of the two faces, the edges of said cavities being aligned so that a complete object is molded in each set of cavities, and reinforcing braces comprising ridges formed in each of the outer faces of said plates, said ridges extending in transverse directions between four adjacent cavities, button portions being pressed up at diagonally opposite corners of one of said plates and raised cavities being formed in the other to receive said button portions.

JOHN KAPPEL.

REFERENCES CITED

The following references are of record in the file of this patent:

UNITED STATES PATENTS

| Number | Name | Date |
|---|---|---|
| 508,285 | Cole | Nov. 7, 1893 |
| 802,455 | Kinzer | Oct. 24, 1905 |
| 1,020,004 | Wishman | Mar. 12, 1912 |
| 1,560,205 | Cassell | Nov. 3, 1925 |
| 1,876,182 | Urbany | Sept. 6, 1932 |
| 2,021,037 | Walper | Nov. 12, 1935 |